ADJUSTABLE DELAY LINE

Filed Aug. 6, 1958

Inventors
MICHAEL A. ARGENTIERI
FRANCIS E. LIND
By Philip M. Bolton
Attorney

United States Patent Office 3,020,497

Patented Feb. 6, 1962

3,020,497

ADJUSTABLE DELAY LINE

Michael A. Argentieri, Lyndhurst, and Francis E. Lind, Totowa Borough, N.J., assignors to International Telephone and Telegraph Corporation, Nutley, N.J., a corporation of Maryland Filed Aug. 6, 1958, Ser. No. 753,493
3 Claims. (Cl. 333—30)

This invention relates to magnetostrictive signal delay devices and more particularly to an adjustable delay means for obtaining a desired delay over a predetermined range.

In the past, it has been customary to obtain a delay for a signal or a pulse by the use of delay lines which utilize either distributed or lumped constants. As the need for finer control of signal delays appeared, the art developed to a point wherein long helically wound coils having sliding contacts came into wide use. This scheme provided for a fair degree of fine control by which it was possible to control the amount of delay introduced on a turn-to-turn basis. Certain drawbacks, however, such as wear of the conductor due to the sliding contacts caused the state of the art to be advanced by the introduction of a shielded helical-type delay line in which a magnetic field was used to saturate a core disposed within the helix. The saturated core provided a discontinuity to pulses applied to the shielded helix and reflected these pulses from the discontinuity. A movable magnetic field provided for fairly fine control of the amount of delay applied to the signal by adjusting the point at which the discontinuity was introduced and removed the objection to sliding contacts by eliminating them.

More recently, however, delay lines which are magnetostrictive in nature have come into wide use because substantially small lengths provide reasonably long delays. The fact that magnetostrictive delay lines make use of magnetically induced mechanical variations and the further fact that their constants are fixed and not subject to deterioration causes wide use of this type of line especially in systems where high reliability is required.

Magnetostrictive delay lines, as used in present systems, generally consist of a length of magnetostrictive wire suitably mounted such that an input is applied by a transducer on one end of the wire. A second transducer, the output, is usually coupled at some other point along the wire and is movable with respect to the wire to permit any delay within the range of delays provided by the line to be picked off. It has been found, however, that such an arrangement is rather cumbersome in that, when long delays are required, a plurality of long delay lines and their accompanying mechanical arrangements must be used. Such arrangements have been found to be disadvantageous in systems wherein small size and simplicity are definite requirements.

The present application shows a more sophisticated embodiment of an invention disclosed in a copending application, Serial No. 753,462, entitled "Adjustable Delay Line" in the names of W. A. Anderson, F. T. Gutmann and A. Rothbart, and now abandoned. The above mentioned copending application is intended to be filed simultaneously with the present application. The present application is an improved version of the device disclosed in the copending application in that the structure disclosed herein provides for improved tracking of a transducer about the turns of a helical delay line and provides for a ruggedized structure having improved resolution and resettability.

It is, therefore, an object of this invention to provide a magnetostrictive delay line which is superior to prior art magnetostrictive delay lines.

Another object is to provide a delay line which provides substantially greater delays per unit of axial length than prior art magnetostrictive delay lines.

A further object is to provide an improved mechanical arrangement which permits an adjustable magnetostrictive delay line to be wound in helical form thereby providing a simple and compact delay line which is not shown in the prior art.

Still a further object is to provide a ruggedized delay line which has improved resolution and resettability characteristics.

A feature of this invention is the utilization of a helical magnetostrictive delay line for transmitting a signal therealong having transducers coupled to separate portions of the helical delay line, to apply a signal to and to receive a signal from the delay line. In addition, means for simultaneously applying a linear component of motion and a rotary component of motion to one of the transducers are utilized such that the length of the helical delay line is adjusted between the transducers thereby determining the amount of delay applied to the signal.

Another feature is the utilization of a rotatable helix-support structure disposed internally of the helical delay line.

The foregoing and other objects and features of this invention will become more apparent by reference to the following description taken in conjunction with the accompanying drawings, wherein.

Figure 2:
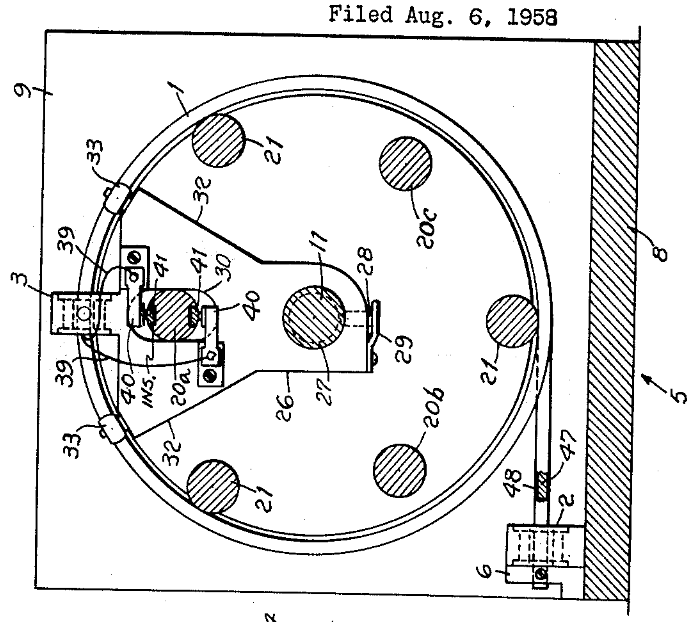
FIG. 2 is a cross-sectional view taken along lines 2—2 of FIG. 1.
Figure 1:
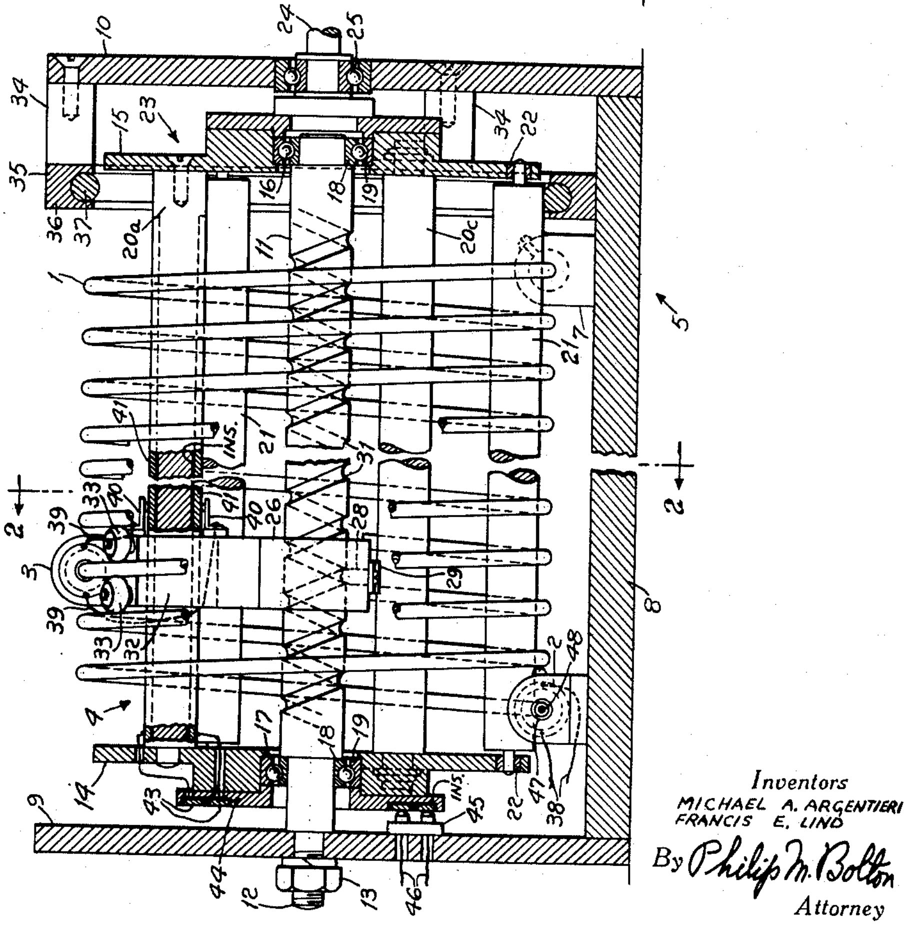
FIG. 1 is a longitudinal partial cross-sectional drawing of an embodiment of an adjustable magnetostrictive helical delay line made in accordance with the principles of this invention.

In FIGS. 1 and 2, a helical magnetostrictive delay line 1 for transmission of a signal therealong is shown. Magnetostrictive transducers 2, 3 are shown coupled about portions of helical magnetostrictive delay line 1 and are utilized to apply a signal to and to receive a signal from delay line 1, respectively. Further, means 4 are shown which simultaneously apply a linear component of motion and a rotary component of motion to one of transducers 2, 3 such that the length of helical delay line 1 is adjusted between transducers 2, 3 thereby determining the amount of delay applied to a signal placed on delay line 1.

Helical delay line 1 may be fabricated in a number of ways to minimize deformation and sag during operation. In one method, the magnetostrictive material which may consist of flexible thin-wall nickel tubing, a single wire or a number of fine wires is encased in a thermoplastic tube which is then molded into the required helical form by heating at a proper temperature. In another method helical line 1 may be formed by encasing the magnetostrictive material in a plastic tube such as Teflon. The plastic encased magnetostrictive material is then placed in a metal tube, such as copper, and cold worked into the required helical form. The metal tube is then slit longitudinally along the direction of pulse propagation to eliminate eddy currents which would shield the delay line material from the magnetic field of the transducer coil.

Helical delay line 1 is disposed coaxial of a given axis and is held in fixed position relative to housing member 5 by clamps 6, 7 which are fixed to the horizontal member 8 of housing member 5. Housing member 5 which may be fabricated from some metal such as aluminum has, in addition, end portions 9, 10 between which helical delay line 1 is mounted. Included in the means 4 to affect a given relative motion between the helical delay line 1 and one of the transducers 2, 3 is a threaded metal shaft 11 disposed coaxially of the given axis. Threaded shaft 11, preferably made of brass, is fixedly attached to end portion 9 by means of a threaded extension 12 of shaft 11 which passes through end portion 9 and is fixed thereto by nut and lock washer asembly 13. Further included in means 4 are metallic end-frame members 14, 15 which are carried by ball bearings 16, 17 and are disposed adjacent the ends of threaded shaft 11. End-frame members 14, 15 may be made of some light weight metal such as aluminum. The inner races 18 of ball bearings 16, 17 are, for the purposes of this invention, connected to shaft 11 and there is no relative motion between shaft 11 and inner race 18. The outer races 19, however, have mounted thereon end-frame members 14, 15 so that end frame members 14, 15 are rotatable about fixed threaded shaft 11. Spacer rods **20*a*, 20*b*, 20*c*, used to maintain the radial and axial position of end-frame members 14, 15 fixed with respect to each other, are disposed 120° apart and parallel to the given axis. The spacer rods 20*a*, 20*b*, 20*c*, are made of metal such as stainless steel and are rigidly held to the end frame members 14, 15 by any means well known to those skilled in the art. Helix support rods 21 are also included in means 4 and are shown in FIGS. 1, 2 rotatably connected to end frame members 14, 15 by means of low friction bearings 22, such as Oilite bearings, which are mounted in end frame members 14, 15. The helix support rods 21 are made of a metal such as aluminum and are shown disposed 120° apart, parallel to the given axis and in engaging relation with the turns of the helical delay line 1 on the inner surface of the helical delay line 1. The end frame members 14, 15, the spacer rods 20*a*, 20*b*, 20*c*, and the helix support rods 21, therefore, comprise a cage-like structure which is rotatable about fixed threaded shaft 11 and within fixed helical line 1. For purposes of simplification, the combination of end frame members 14, 15, spacer rods 20*a*, 20*b*, 20*c*, and helix support rods 21 will hereinafter be referred to as cage 23. A shaft 24, carried by a ball bearing 25 which is mounted in end portion 10, is rotatably connected to end frame member 15 such that the rotation of shaft 24 rotates cage 23 about threaded shaft 11 and within helical delay line 1**.

In FIGS. 1 and 2, magnetostrictive input transducer 2 is shown fixedly mounted to horizontal housing member 8 and coupled to helical delay line 1 which is terminated by clamp 6 after passing through transducer 2. Output transducer 3 is shown coupled to delay line 1 and connected to a support member 26 which is threadably receivable on threaded shaft 11. Transducer support member 26 contains an aperture 27 through which threaded shaft 11 passes. The interior of aperture 27 may be threaded to mate with the threads on shaft 11 but a simple arrangement comprising a key 28 and a bracket 29 is shown fixedly mounted to transducer support member 26 to cause transducer 3 to advance in a linear direction as transducer support member 26 is rotated. Transducer support member 26 contains another aperture 30, through which spacer rod **20*a* passes in tight fitting relationship with the straight sides of aperture 30. Thus, as cage 23 is rotated, spacer rod 20*a* follows this rotation due to its fixed position between end-frame members 14, 15; and transducer support member 26, because support rod 20 passes through aperture 30, is caused to rotate. Thus, a rotary component of motion is applied to transducer 3 by rotation of cage 23 and a linear component of motion is applied simultaneously to transducer 3 by the action of the threads 31 of threaded shaft 11 bearing against key 28. The pitch of the threads 31 is selected relative to the pitch of the helix 1 such that for one complete revolution of the cage 23, the transducer 3 travels a linear distance which is equal to the pitch of helix 1**.

Transducer support member 26 contains flared portions 32 integral with the transducer support member 26 which are used to support and position a plurality of trolleys 33. The trolleys 33 which are rotatably mounted on the flared portions 32 of member 26 are used to guide the turns of helical delay line 1 through transducer 3 in such a way that a clearance is maintained between the transducer 3 and the helix 1. Distortion of the helix 1 due to transducer 3 bearing against the turns of the helix 1 is thereby prevented.

End portion 9 has a plurality of extensions 34 associated therewith, which, at the extremity of their extension, support an annular ring 35 having a groove 36 disposed in the inner surface thereof. Groove 36 contains an O ring 37 made of rubber or some other material which provides for frictional contact engaging the helix support rods 21 so that upon rotation of cage 23 helix support rods 21 rotate on their own axes. By this means, sliding engagement between the turns of the helix 1 and the support rods 21 is minimized and at the same time the helix is supported and maintained in its original shape.

In FIG. 1, input transducer 2 is energized by placing an electrical signal on input leads 38. By magnetostrictive action, the electrical signal is converted in the magnetostrictive helical delay line 1 to a mechanical impulse which travel along the helical line 1 at a known sonic rate. A given amount of delay may then be introduced by rotating shaft 24 which adjust the length of the delay line between transducers 2 and 3. The output transducer 3 which has been adjusted to apply a given delay to the signal reconverts the mechanical impulse to an electrical signal. Output leads 39 apply the electrical signal through sliding contacts 40 to two insulated conductive strips 41 which are inlaid on the surface of spacer rod **20*a*. From thence, the signal is carried by leads 42 to insulated annular slip rings 43 which are inlaid in a ball-bearing retainer member 44. Contacts 45 then pick-off the signal from slip rings 43 and apply it to output terminals 46 which are mounted on end portion 9**.

It should be noted, at this point, that proper operation of the device disclosed herein is not only dependent upon the cooperation of all the elements involved but also, as far as the transmission of the signal from input transducer 2 to output transducer 3 along helical delay line 1 is concerned, is dependent upon the proper fabrication of helical delay line 1 as described previously. Care must be taken to insure that the magnetostrictive portion 47 of helical delay line 1 is mechanically isolated from helix support rods 21 to prevent unwanted damping of the signal as the signal passes along helical delay line 1. This signal damping is prevented by placing a covering of plastic material 48 such as Teflon about the turns of the helix. In addition, the use of low-friction material, such as Teflon, provides for ease of movement as cage 23 is rotated internally of helical delay line 1.

Because helical delay line 1 is supported mechanically by helix support rods 21 and because output transducer 3 is guided about the turns of helical delay line 1 by trolleys 33, a ruggedized adjustable delay line is provided which is not subject to warping and which is better able to withstand shock and vibration. Further, because the helical line 1 is properly supported and kept substantially free from warping, it is possible to obtain improved resolution and resettability.

While we have described above the principles of our invention in connection with specific apparatus it is to be clearly understood that this description is made only by way of example and not as a limitation to the scope of our invention as set forth in the objects thereof and in the accompanying claims.

We claim:

1. An adjustable delay line comprising a housing member having two end portions, a helical magnetostrictive delay line fixedly mounted between said end portions coaxially of a given axis for transmitting a signal therealong, said helical delay line having a low-friction material overlying the turns of said helical delay line to mechanically isolate said delay line thereby preventing mechanical damping of said signal, a first transducer coupled about a portion of said helical delay line and disposed a given distance from said given axis, a second transducer coupled about another portion of said helical delay line, a threaded shaft fixed to one of said end portions disposed coaxially of said given axis, ball bearing members having inner and outer races disposed adjacent the ends of said shaft, said inner races being carried about said shaft, rotatable end-frame members carried by said outer races, a plurality of support rods disposed parallel to said given axis and rotatably connected at their ends to said end-frame members in engaging relation with the turns of said helical delay line, a plurality of spacer rods disposed parallel to said given axis fixedly attached to said end-frame members, a member threadably receivable on said threaded shaft and connected to said first transducer, said member having an aperture such that one of said spacer rods passing through said aperture maintains said member in a fixed radial position, a plurality of guide trolleys mounted on said member such that the turns of said helical delay line are guided through said first transducer, an O ring supported by said housing end portions coaxially of said given axis to frictionally bear against a portion of said support rods to rotate said support rods about their axes upon rotation of said end-frame members, and means for adjusting the rotary position of said end-frame members thereby determining the amount of delay applied to said signal.

2. An adjustable delay line comprising a housing member having two end portions, a helical magnetostrictive delay line fixedly mounted between said end portions coaxially of a given axis for transmitting a signal therealong, a transducer coupled about a portion of said helical delay line to apply a signal thereto, another transducer coupled about another portion of said helical delay line to receive said signal therefrom, a threaded shaft disposed coaxially of said given axis, means for simultaneously applying a linear component of motion and a rotary component of motion to said one of said transducers including a substantially triangular yoke having an aperture disposed therein threadably receivable on said shaft, said yoke flaring radially from said shaft and having trolleys carried by two apexes thereof, said one of said transducers being mounted intermediate said apexes such that the turns of said helical line are guided by said trolleys through said one of said transducers and such that for one complete rotation of said yoke said one of said transducers travels a linear distance which is equal to the pitch of said helical delay line, and a cage revolvably mounted on said end portions coaxially of said given axis including a plurality of members independently rotatable and a plurality of spacer elements, each of said rotatable members being disposed for rotary engagement with all the turns of said delay line, means supported by said housing end portions coaxially of said given axis to frictionally bear against a portion of each of said plurality of rotatable members to rotate said members about their axes upon rotation of said cage, one of said spacer elements passing through said aperture in said yoke member, thereby fixedly maintaining the relative positions of said one of said spacer elements and said yoke and means electrically coupling said one of said transducers to said two conductors.

3. An adjustable delay line comprising a housing member having two end portions, a helical magnetostrictive delay line fixedly mounted between said end portions coaxially of a given axis for transmitting a signal therealong, a transducer coupled about a portion of said helical delay line to apply a signal thereto, another transducer coupled about another portion of said helical delay line to receive said signal therefrom, a threaded shaft disposed coaxially of said given axis, a member threadably receivable on said shaft supporting said one of said transducers such that for one complete rotation of said member said one of said transducers travels a linear distance equal to the pitch of said helical delay line, a cage revolvably mounted on said end portions coaxially of said given axis, rotary members carried by said cage member disposed parallel to said given axis and each said rotary member being in contacting relationship with all the turns of said helically shaped delay line, and means to rotate said rotary members when said cage is rotated to minimize sliding engagement between said rotary members and said turns, said rotary members serving to support and maintain the shape of said helical delay line.

References Cited in the file of this patent

UNITED STATES PATENTS

| | | |
|---|---|---|
| 1,549,612 | Rohde | Aug. 11, 1925 |
| 2,452,676 | O'Brien | Nov. 2, 1948 |
| 2,461,804 | Atwood | Feb. 15, 1949 |
| 2,482,181 | Henderson | Sept. 20, 1949 |
| 2,558,326 | Van Dyke | June 26, 1951 |
| 2,813,956 | Sorber | Nov. 19, 1957 |
| 2,846,654 | Epstein et al. | Aug. 5, 1958 |